(No Model.)
J. C. RAYMOND.
PNEUMATIC TIRE.
No. 584,193. Patented June 8, 1897.
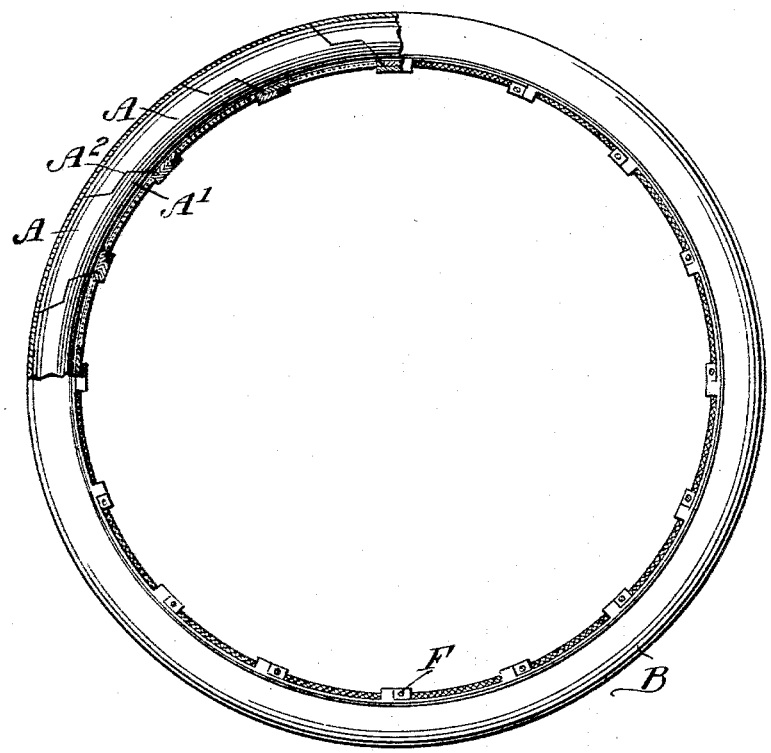
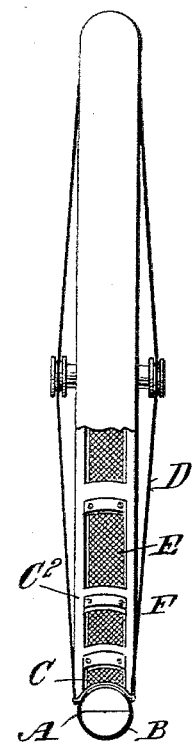
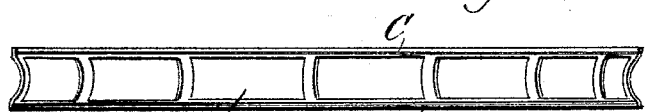
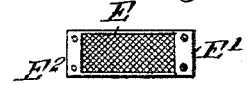
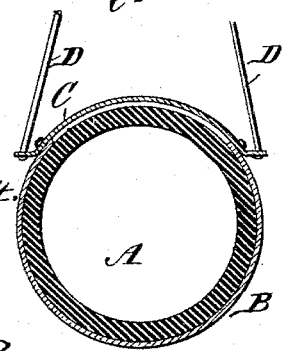
WITNESSES:
INVENTOR
John Carlyle Raymond
BY
ATTORNEYS.

UNITED STATES PATENT OFFICE.

JOHN CARLYLE RAYMOND, OF NEW YORK, N. Y.

PNEUMATIC TIRE.

SPECIFICATION forming part of Letters Patent No. 584,193, dated June 8, 1897.

Application filed July 3, 1896. Serial No. 597,962. (No model.)

*To all whom it may concern:*

Be it known that I, JOHN CARLYLE RAYMOND, of New York, in the county and State of New York, have invented a new and Improved Pneumatic Tire, of which the following is a full, clear, and exact description.

The object of the invention is to provide a new and improved sectional pneumatic tire arranged to permit a convenient and quick removal of a punctured section and insertion of a new one without deflating the remaining sections or disturbing their positions on the wheel.

The invention consists principally of a tire made in sections and inclosed in a flexible circular casing slotted or open at the inside and a rim carrying the said casing and formed with openings affording access to the said sections.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement with part in section. Fig. 2 is an end elevation of the same with part in section. Fig. 3 is a sectional plan view of the rim. Fig. 4 is an enlarged cross-section of the improvement. Fig. 5 is a perspective view of one of the sections. Fig. 6 is a plan view of one of the doors, and Fig. 7 is a side elevation of the same.

The improved pneumatic tire is provided with a series of pneumatic tire-sections A, fitted one on the other so as to form a continuous circular tire, as indicated in Figs. 1 and 2. Each section A is made of rubber or other flexible material and is inflated in a suitable manner, and each section is formed at one end with a projection $A'$ and at the other end with an undercut $A^2$, adapted to receive the projection $A'$ of the next-following section, so that the several sections form lock-joints with each other.

The sections A are contained within a casing B, made of canvas or other suitable material, the casing being open or slotted at the inside, and the sides are fastened to a rim C, made of metal, wood, or other suitable material and connected with the spokes D. Thus when the several sections A are in place in the casing B they interlock with each other at their ends and are held in this interlocked position by the surrounding casing B.

The rim C is formed with openings $C'$, adapted to be closed by doors E, the said openings giving access to the sections A, so as to permit of conveniently removing any one of the sections through the corresponding opening $C'$ in the rim C.

The doors E may be of wire-netting with sheet-metal ends $E'$ and $E^2$, or of sheet metal throughout, the end $E'$ being formed with a shoulder adapted to receive the straight end $E^2$ of the next-following door. The straight end $E^2$ is adapted to pass under the cross-piece $C^2$ of the rim C, the said cross-piece dividing two adjacent openings $C'$, as indicated in the drawings.

Set-screws F or other fastening means may be employed for fastening the overlapping ends $E'$ and $E^2$ of two adjacent doors E with each other, so as to securely lock the doors in place.

It is evident that if one of the sections A is punctured and it becomes deflated then the rider by removing the screws F of the corresponding door E for that section can conveniently remove the section through the opening $C'$ in the rim C. A new section can be inserted through the opening into the casing B and fitted with its ends into adjacent ends of the other two sections. The opening is then again closed by the door E and the wheel is again in condition for use. The sections A may be inflated before placing the same in position in the casing or after they are put into the casing.

Having thus described my invention, I claim as new and desire to secure by Letters Patent—

1. A pneumatic tire, comprising a series of pneumatic sections, a flexible circular casing adapted to receive the sections and open at the inside, and a rim carrying the said casing and formed with openings registering with the open inside of the casing, to permit of inserting or removing the said pneumatic sections, substantially as shown and described.

2. A pneumatic tire, comprising a series of pneumatic sections, a flexible circular casing adapted to receive the sections and open at the inside, a rim carrying the said casing and formed with openings registering with the open inside of the casing, to permit of inserting or removing the said pneumatic sections, and doors for closing the said openings in the rim, substantially as shown and described.

3. A pneumatic tire, comprising a circular casing having at its inner side a circumferentially-extended slot or opening, a series of interlocking pneumatic sections held in the said casing, and a rim to which the sides of said casing are fastened, the said rim being formed with openings, substantially as shown and described.

JOHN CARLYLE RAYMOND.

Witnesses:
THEO. G. HOSTER,
JNO. M. RITTER.